US010642672B2

(12) United States Patent
Ragupathi et al.

(10) Patent No.: US 10,642,672 B2
(45) Date of Patent: May 5, 2020

(54) SYSTEMS AND METHODS FOR DYNAMIC THERMAL EXCURSION TIMEOUT DETERMINATION AND PREDICTIVE FAILURE NOTIFICATION BASED ON AIRFLOW ESCAPE DETECTION

(71) Applicant: Dell Products L.P., Round Rock, TX (US)

(72) Inventors: Dinesh Kunnathur Ragupathi, Round Rock, TX (US); Timothy M. Lambert, Austin, TX (US); Syama Poluri, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 301 days.

(21) Appl. No.: 14/823,521

(22) Filed: Aug. 11, 2015

(65) Prior Publication Data

US 2017/0046242 A1  Feb. 16, 2017

(51) Int. Cl.
*G06F 11/07* (2006.01)
*G06F 11/30* (2006.01)

(52) U.S. Cl.
CPC ...... *G06F 11/0754* (2013.01); *G06F 11/0706* (2013.01); *G06F 11/0757* (2013.01); *G06F 11/3044* (2013.01); *G06F 11/3058* (2013.01)

(58) Field of Classification Search
CPC .. G06F 11/3495; G06F 11/0706; G06F 11/07; G06F 11/0796; G06F 11/0754; G06F 11/0757; G06F 11/3044; H05K 7/20718; H05K 7/20709; H05K 7/20836; H05K 7/20727

USPC .......................................................... 702/184
See application file for complete search history.

(56) References Cited

U.S. PATENT DOCUMENTS

| 6,819,563 | B1 * | 11/2004 | Chu ................... | G11B 33/1406 165/104.33 |
| 6,889,908 | B2 | 5/2005 | Crippen et al. | |
| 8,764,405 | B2 | 7/2014 | Mashak et al. | |
| 2002/0149911 | A1 * | 10/2002 | Bishop ............... | H05K 7/20736 361/690 |
| 2004/0262409 | A1 * | 12/2004 | Crippen .................. | G06F 1/206 236/49.3 |
| 2009/0071636 | A1 * | 3/2009 | Novotny ................. | F28D 15/00 165/104.33 |
| 2009/0256453 | A1 * | 10/2009 | Wang ...................... | E05B 65/46 312/222 |

(Continued)

*Primary Examiner* — Herve-Louis Y Assouman
(74) *Attorney, Agent, or Firm* — Jackson Walker L.L.P.

(57) ABSTRACT

In accordance with embodiments of the present disclosure, an information handling system may include a plurality of information handling resources and a controller communicatively coupled to the plurality of information handling resources. The controller may be configured to monitor for the presence of a thermal escape event of the information handling system. The controller may also be configured to, responsive to detecting the presence of the thermal escape event, determine one or more affected information handling resources of the plurality of information handling resources, wherein the one or more affected information handling resources comprise information handling resources thermally affected by the thermal escape event. The controller may further be configured to determine for each of the one or more affected information handling resources a respective thermal excursion timeout period.

18 Claims, 4 Drawing Sheets

(56) References Cited

U.S. PATENT DOCUMENTS

2012/0069514 A1* 3/2012 Ross .................. H05K 7/20727
361/679.33

* cited by examiner

SYSTEMS AND METHODS FOR DYNAMIC THERMAL EXCURSION TIMEOUT DETERMINATION AND PREDICTIVE FAILURE NOTIFICATION BASED ON AIRFLOW ESCAPE DETECTION

TECHNICAL FIELD

The present disclosure relates in general to information handling systems, and more particularly to systems and methods for providing for a dynamic thermal excursion timeout and predictive failure notification for information handling resources of an information handling system based on detection of airflow escape.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

For servicing information handling system components (e.g., storage resources such as hard disk drives and solid-state drives), it is common and allowable for users to remove a chassis cover of a rack or tower server system or pull out a drawer or sled comprising the components while the respective systems are in operation. Removal of the chassis cover or drawer may cause an air channel escape path that prevents adequate cooling of all of the components in the system. If the air channel escape path persists for long enough, some components may reach thermal thresholds and may be shut down to prevent permanent damage from overheating.

In existing implementations of storage drawers, there is a gross determination of the drawer being fully closed or open to any degree. Typically, only a user manual document and/or warning label is available to give the user guidance that an air escape situation can persist for a fixed amount of time (e.g., three minutes or five minutes). Such fixed amount of time represents a worst case scenario of expected failure of a component, but oftentimes such time may be significantly less than an actual failure time of particular components (e.g., some types of storage resources may be less susceptible to overheating in the absence of thermal cooling).

Thus, current approaches are grossly simple in terms of notifying if a drawer is open or closed and thermal algorithms try to react but this is known to be ineffective in airflow escape scenarios for long periods. This rudimentary approach is ineffective in many cases as it relies solely on human care. This threshold level of time is a static number for all worst case components in a system but in reality can vary wildly based on various parameters. For example, when a drawer comprising multiple storage resources is pulled out, a system may grossly indicate that the drawer is open, but in such a scenario, some storage devices may remain inside a chassis when the drawer is not fully extracted (such as when replacing just the outermost rows of storage resources), and accordingly, the storage resources remaining in the chassis may still receive acceptable cooling.

SUMMARY

In accordance with the teachings of the present disclosure, the disadvantages and problems associated with thermal management of information handling resources.

In accordance with embodiments of the present disclosure, an information handling system may include a plurality of information handling resources and a controller communicatively coupled to the plurality of information handling resources. The controller may be configured to monitor for the presence of a thermal escape event of the information handling system. The controller may also be configured to, responsive to detecting the presence of the thermal escape event, determine one or more affected information handling resources of the plurality of information handling resources, wherein the one or more affected information handling resources comprise information handling resources thermally affected by the thermal escape event. The controller may further be configured to determine for each of the one or more affected information handling resources a respective thermal excursion timeout period.

In accordance with these and other embodiments of the present disclosure, a method may include monitoring for the presence of a thermal escape event of an information handling system comprising a plurality of information handling resources. The method may also include responsive to detecting the presence of the thermal escape event, determining one or more affected information handling resources of the plurality of information handling resources, wherein the one or more affected information handling resources comprise information handling resources thermally affected by the thermal escape event. The method may further include determining for each of the one or more affected information handling resources a respective thermal excursion timeout period.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Preferred embodiments and their advantages are best understood by reference to FIGS. 1-4, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU"), microcontroller, or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, and/or any other components and/or elements of an information handling system.

Figure 1:
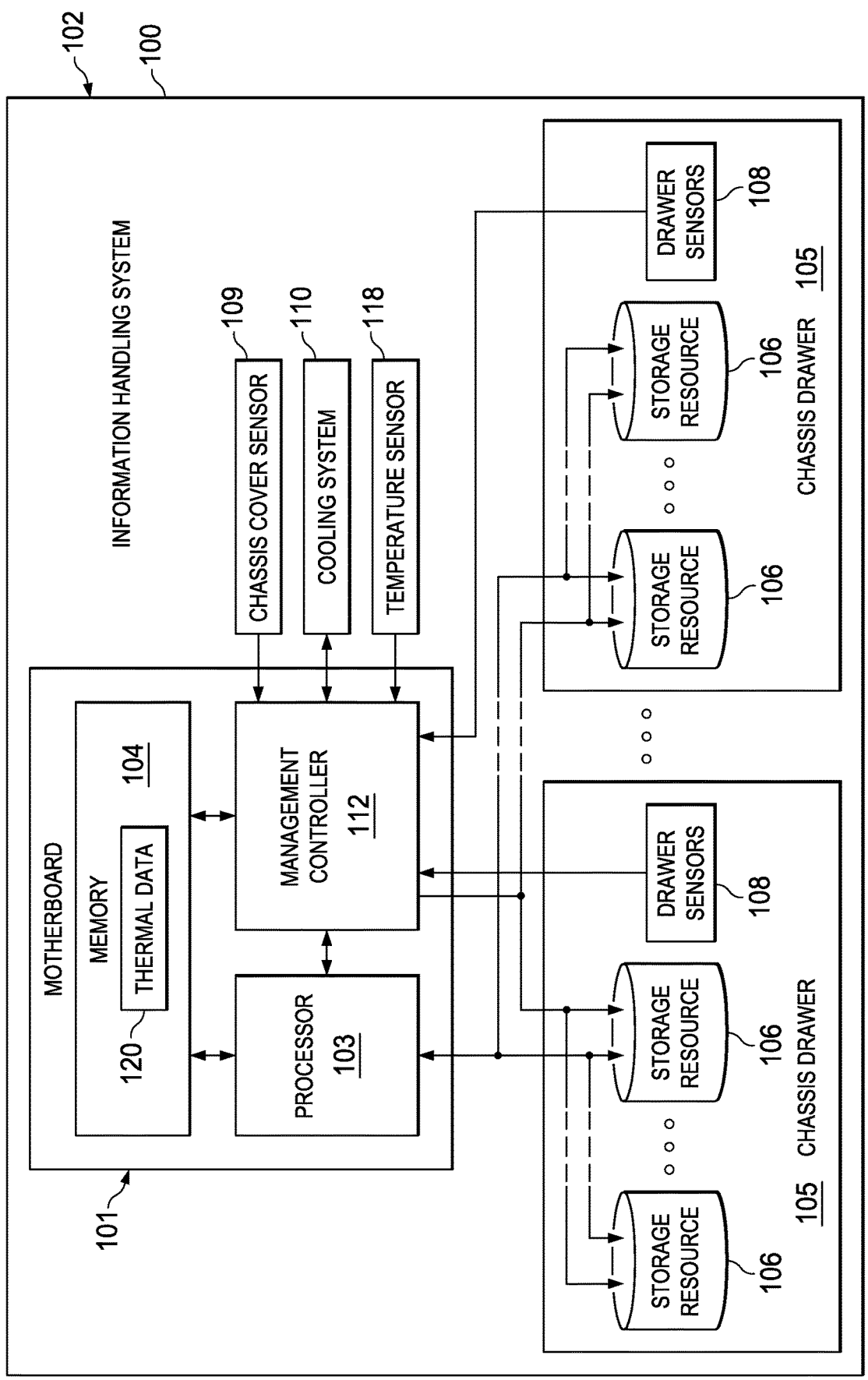
FIG. 1 illustrates a block diagram of selected components of an example information handling system, in accordance with embodiments of the present disclosure.

FIG. 1 illustrates a block diagram of an example information handling system 102 including functionality for providing user-visible thermal performance degradation monitoring. In some embodiments, information handling system 102 may comprise a server. In other embodiments, information handling system 102 may be a personal computer (e.g., a desktop computer, a laptop, notebook, tablet, handheld, smart phone, personal digital assistant, etc.). In yet other embodiments, information handling system 102 may comprise a storage enclosure.

As shown in FIG. 1, information handling system 102 may include a chassis 100 housing a motherboard 101, a plurality of storage resources 106 carried in chassis drawers 105, a plurality of drawer sensors 108, a chassis cover sensor 109, a cooling system 110, and one or more temperature sensors 118.

Chassis 100 may be an enclosure that serves as a container for various information handling systems and information handling resources, and may be constructed from steel, aluminum, plastic, and/or any other suitable material. Although the term "chassis" is used, chassis 100 may also be referred to as a case, cabinet, tower, box, enclosure, and/or housing. In certain embodiments, chassis 100 may be configured to hold and/or provide power to a plurality of information handling systems and/or information handling resources.

Motherboard 101 may include a circuit board configured to provide structural support for one or more information handling resources of information handling system 102 and/or electrically couple one or more of such information handling resources to each other and/or to other electric or electronic components external to information handling system 102. As shown in FIG. 1, motherboard 101 may include a processor 103, a memory 104, and a management controller 112 communicatively coupled to processor 103.

Processor 103 may include any system, device, or apparatus configured to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in a storage resource 106, memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

As shown in FIG. 1, memory 104 may also have stored thereon thermal data 120. As described in greater detail below, thermal data 120 may include any suitable information regarding thermal characteristics of information handling resources of information handling system 102. For example, in some embodiments, thermal data 120 may include information that may be used by management controller 112 to, for an individual storage resource 106, calculate a thermal excursion timeout for such individual storage resource 106 based on the type of storage resource 106, physical location of the storage resource within information handling system 102, the temperatures present in information handling system 102 (e.g., as sensed by temperature sensor 118), the speed of a motor for moving a cooling fluid provided by cooling system 110, information from drawer sensors 108 and chassis cover sensor 109, or other factors. Thus, thermal data 120 may include information characterizing, for each of one or more types of storage resources 106, its thermal performance in response to such factors.

A management controller 112 may be communicatively coupled to processor 103 and memory 104 and may comprise any system, device, or apparatus configured to facilitate management and/or control of components of information handling system 102, information handling systems modularly coupled within, and/or one or more of its component information handling resources. Management controller 112 may be configured to issue commands and/or other signals to manage and/or control information handling resources of information handling system 102. Management controller 112 may comprise a microprocessor, microcontroller, DSP, ASIC, field programmable gate array ("FPGA"), EEPROM, or any combination thereof.

In addition or alternatively, management controller 112 may also provide a management console for user/administrator access to these functions. For example, management controller 112 may provide for communication with a user interface, permitting a user to interact with management controller 112 and configure control and management of components of information handling system 102 by management controller 112. As another example, management controller 112 may act as a proxy and establish communication between two information handling resources by either configuring them to directly couple to each other or transfer information by receiving information from one information handling resource, processing the information if needed, and then transferring the information to the other information handling resource. As a further example, management controller 112 may implement Web Services Management ("WS-MAN") or another suitable management protocol permitting a user to remotely access a management controller 112 to configure information handling system 102 and its various information handling resources. In such embodiments, management controller 112 may interface with a network interface separate from a traditional network interface of information handling system 102, thus allowing for "out-of-band" control of information handling system 102, such that communications to and from management controller 112 are communicated via a management channel physically isolated from an "in band" communication channel with the traditional network interface. Thus, for example, if a failure occurs in information handling system 102 that prevents an administrator from interfacing with information handling system 102 via a traditional network interface and/or user interface (e.g., operating system failure, power failure, etc.), the administrator may still be able to monitor and/or manage information handling system 102 (e.g., to diagnose problems that may have caused failure) via management controller 112. In the same or alternative embodiments, management controller 112 may allow an administrator to remotely manage one or more parameters associated with operation of information handling system 102 and its various information handling resources (e.g., power usage, processor allocation, memory allocation, security privileges, etc.). In certain embodiments, management controller 112 may include or may be an integral part of a chassis management controller (CMC), a baseboard management controller (BMC), a Dell Remote Management controller (DRAC), an Integrated Dell Remote Management controller (iDRAC), or an enclosure controller (EC). In these and other embodiments, management controller 112 may also be referred to as an access controller or a life-cycle controller.

As described in greater detail below, management controller 112 may also be configured to, based on telemetry data (e.g., from drawer sensors 108, chassis cover sensor 109, cooling system 110) and known characteristics of information handling resources (e.g., storage resources 106) stored in thermal data 120, provide dynamic thermal excursion timeout determination and predictive failure notification on an information handling resource by information handling resource (e.g., storage resource 106 by storage resource 106) basis.

A chassis drawer 105 may comprise any suitable structural and/or mechanical system, device, or apparatus for receiving and/or carrying modular information handling resources, such as storage resources 106, for example. As described in greater detail below with respect to FIGS. 2-4, a chassis drawer 105 may be translated by a user between an open and closed position, such that in the open position, a user may service (e.g., remove and/or replace) individual modular information handling resources (e.g., storage resources 106) disposed therein.

Storage resources 106 may be communicatively coupled to processor 103, and may include any system, device, or apparatus configured to retain program instructions and/or data for a period of time (e.g., computer-readable media). Storage resources 106 may include hard disk drives, magnetic tape libraries, optical disk drives, magneto-optical disk drives, compact disk drives, compact disk arrays, disk array controllers, and/or any other system, apparatus or device operable to store media. As shown in FIG. 1, storage resources 106 may be communicatively coupled to management controller 112. In some of such embodiments, such communicative coupling may be via a sideband interface of management controller 112 and/or a storage controller (e.g., a PowerEdge RAID Controller, manufactured and sold by Dell Inc.).

A drawer sensor 108 may be communicatively coupled to management controller 112 and may comprise any electronic system, device, or apparatus configured to generate an electrical or electronic signal indicative of a position of an associated chassis drawer 105. Examples of drawer sensors 108 may include Hall effect or other magnetic sensors, optoelectronic sensors, electrical contact sensors, or other suitable sensors. In some embodiments, each chassis drawer 105 may have a plurality of sensors 104, wherein each such drawer sensor 108 is configured to determine whether the drawer sensor 108 is inside or outside of chassis 100. Accordingly, in such embodiments, drawer sensors 108 may enable management controller 112 to determine not only whether a chassis drawer 105 is in an open or closed position, but also the degree at which chassis drawer 105 is opened when open. In other embodiments, drawer sensors 108 may not reside on chassis drawer 105, but may reside in a slot of chassis 100 for receiving a chassis drawer 105, in which case drawer sensors 108 may indicate the degree of openness of chassis drawer 105 based on whether a portion of chassis drawer 105 is proximate to individual drawer sensors 108.

Chassis cover sensor 109 may be communicatively coupled to management controller 112 and may comprise any electronic system, device, or apparatus configured to generate an electrical or electronic signal indicative of whether a cover of chassis 100 has been removed. Examples of chassis drawer sensor 109 may include a Hall effect or other magnetic sensor, optoelectronic sensor, electrical contact sensor, or other suitable sensor.

Cooling system 110 may be communicatively coupled to management controller 112, and may include any mechanical or electro-mechanical system, apparatus, or device operable to move coolant (e.g., air, other gasses, liquids) throughout a chassis 100 of information handling system 102. In some embodiments, cooling system 110 may comprise a fan (e.g., a rotating arrangement of vanes or blades which act on a gaseous coolant such as air). In other embodiments, cooling system 110 may comprise a blower (e.g., a centrifugal fan that employs rotating impellers to accelerate gaseous coolant received at its intake and change the direction of the airflow). In operation, in the case of a cooling system 110 including an air mover (e.g., fan or blower), the air mover may cool information handling resources of information handling system 102 by drawing cool air into chassis 100 from outside of chassis 100, expel warm air from inside chassis 100 to the outside of chassis 100, and/or move air across one or more heatsinks (not explicitly shown) internal to chassis 100 to cool one or more information handling resources.

In other embodiments, cooling system 110 may comprise mechanisms other than a fan or blower for moving coolant, including liquid pumps, jets, and/or free convection enclosures.

Temperature sensor 118 may be any system, device, or apparatus (e.g., a thermometer, thermistor, etc.) configured to communicate a signal to management controller 112 indicative of a temperature within information handling system 102. In many embodiments, information handling system 102 may comprise a plurality of temperature sensors 118, wherein each temperature sensor 118 detects a temperature of a particular component and/or location within information handling system 102. For example, one temperature sensor 118 may detect an ambient temperature of coolant entering information handling system 102 via a cooling system 110 while another temperature sensor 118 may detect a temperature of processor 103, a storage resource 106, or another information handling resource of information handling system 102.

In addition to motherboard 101, processor 103, memory 104, storage resources 106, management controller 112, drawer sensors 108, chassis cover sensor 109, cooling system 110, and temperature sensor 118, information handling system 102 may include one or more other information handling resources.

Figure 2:
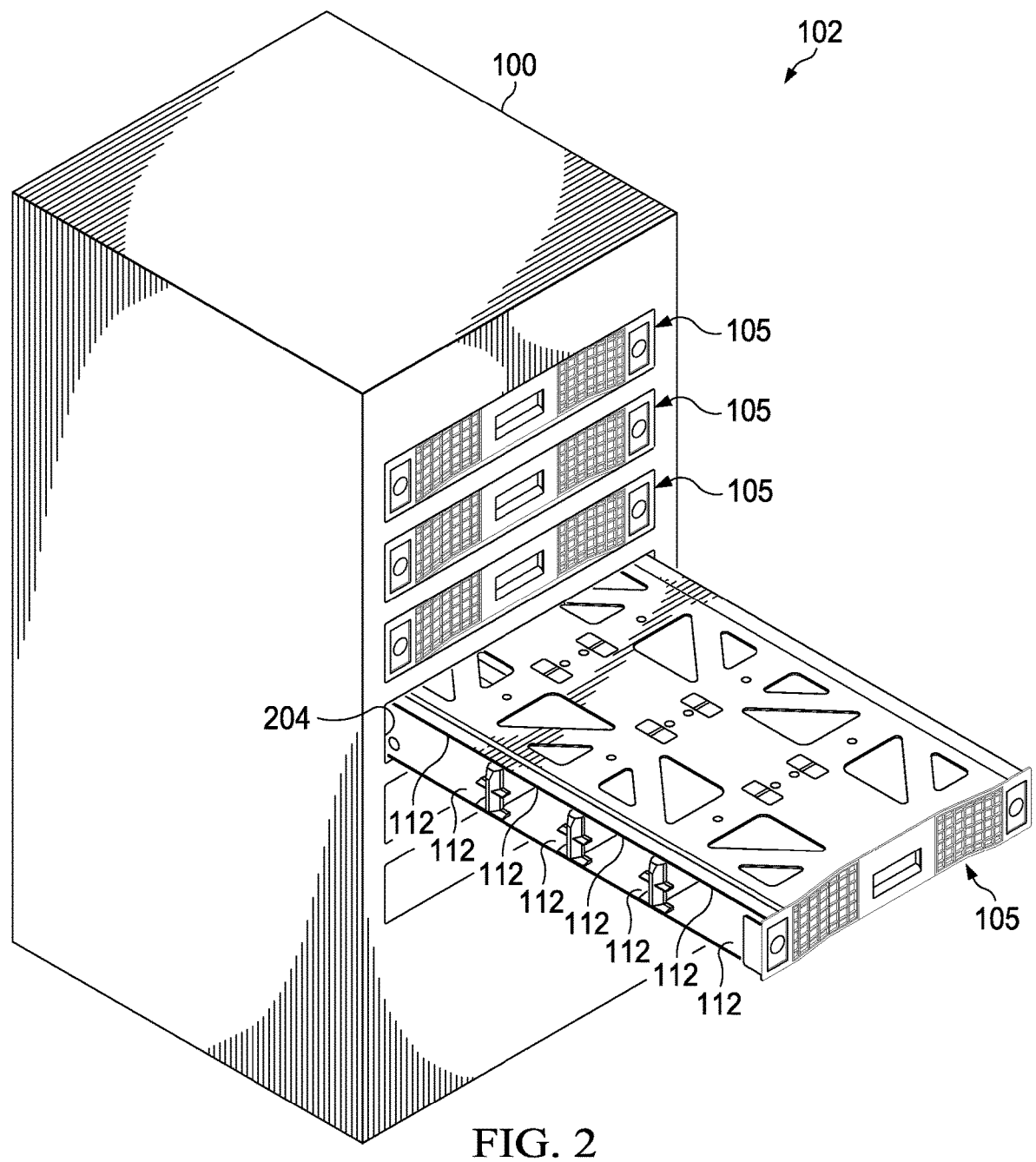
FIG. 2 illustrates a perspective view of an example information handling system, in accordance with embodiments of the present disclosure.

FIG. 2 illustrates a perspective view of an example information handling system 102 with a chassis drawer 105 drawn into an open position, in accordance with embodiments of the present disclosure. As depicted in FIG. 2, chassis 100 may include one or more chassis drawers 105 for receiving information handling resources. As shown in FIG. 2, chassis drawer 105 may have a plurality of bays 112 opening to each side of chassis drawer 105. Each of such bays 212 may be defined by an associated backplane and/or one or more structural elements of chassis drawer 105. Accordingly, a bay 212 may include a suitable combination of structural elements configured to mechanically mate with an information handling resource to allow components of the information handling resource to electrically couple to a backplane when such information handling resource is received into the bay 212. A bay 212 may also be configured to allow modular information handling resources to be easily inserted and removed from the bay 212 as desired by a user.

Although chassis drawer 105 may be constructed so as to support any suitable arrangement of bays 212, in the embodiments represented by FIG. 2, chassis drawer 105 is configured with 16 bays 212, eight on each side of chassis drawer 105 and arranged on each side such that two drives may be oriented one over the other in each of four openings.

In some embodiments, all bays 212 of chassis drawer 105 may be configured to receive identical or similar information handling resources having substantially similar form factors and/or functionality (e.g., 2.5-inch hard disk drives). In other embodiments, some bays 212 may be configured to receive an information handling resource different in form factor and/or functionality than that for which another bay 212 is configured.

Accordingly, chassis drawer 105 may be drawn open allowing partial or full extension of chassis drawer 105 such that a person may access bays 212 to add and/or remove information handling resources from chassis drawer 105. In addition, chassis drawer 105 may be closed such that chassis drawer 105 is substantially telescoped within the depth of a slot 204 of chassis 100 for receiving chassis drawer 105 such that a face of chassis drawer 105 is generally parallel (e.g., "flush" with) with a side of chassis 100.

Figure 3:
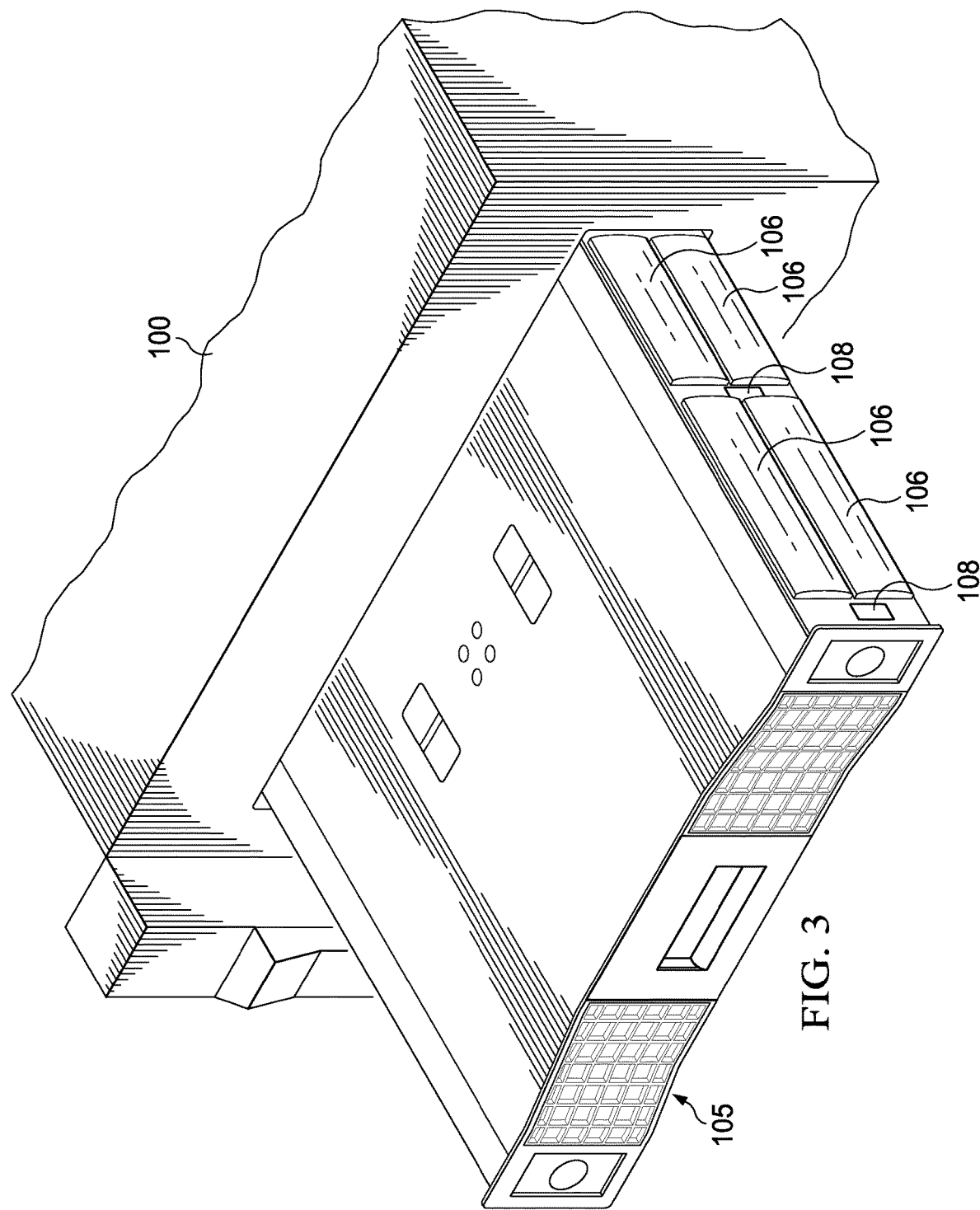
FIG. 3 illustrates a perspective view of an example chassis drawer having bays populated with modular information handling resources, in accordance with embodiments of the present disclosure.

FIG. 3 illustrates a perspective view of example chassis drawer 105 having bays 112 populated with storage resources 106 with chassis drawer 105 being in an at least partially-open position, in accordance with embodiments of the present disclosure. The view shown in FIG. 3 also shows at least a portion of drawer sensors 108 associated with chassis drawer 105. In operation, the two drawer sensors 108 shown as being outside of chassis 100 may be able to communicate signals indicative of their presence outside of chassis 100, from which it may be inferred the degree of openness and the identities of storage resources 106 withdrawn to the exterior of chassis 100 and the identities of storage resources remaining inside chassis 100 on account of chassis drawer 105 being open. While drawer sensors 108 are shown in FIG. 3 as being affixed to chassis drawer 105, in other embodiments drawer sensors 108 may reside interior to chassis 100 regardless of whether chassis drawer 105 is open or closed, or may reside on storage resources 106.

Figure 4:
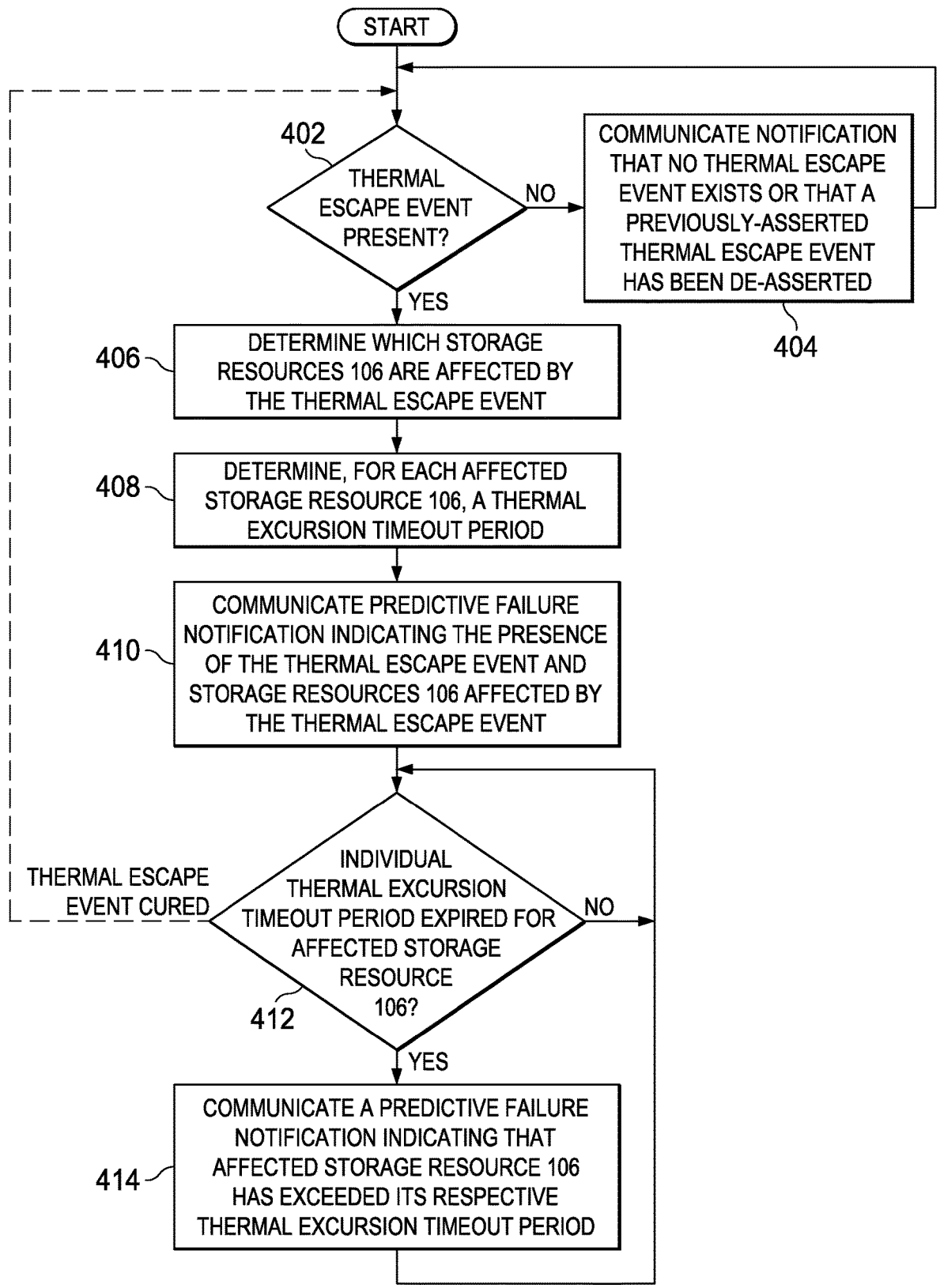
FIG. 4 illustrates a flow chart of an example method for dynamic thermal excursion timeout determination and predictive failure notification based on airflow escape detection, in accordance with embodiments of the present disclosure.

FIG. 4 illustrates a flow chart of an example method 400 for dynamic thermal excursion timeout determination and predictive failure notification based on airflow escape detection, in accordance with embodiments of the present disclosure. According to some embodiments, method 400 may begin at step 402. As noted above, teachings of the present disclosure may be implemented in a variety of configurations of information handling system 102. As such, the preferred initialization point for method 400 and the order of the steps comprising method 400 may depend on the implementation chosen.

At step 402, chassis management controller 112 may monitor for a thermal escape event. A thermal escape event may comprise any event that may cause air to escape from chassis 100 from a location other than an exhaust intended for exhausting air or any event in which an information handling resource is placed in a position in which it may not be effectively cooled by cooling system 110 (e.g., a storage resource 106 residing outside of chassis 100 due to a chassis drawer 105 being at least partially opened). Thus, in some embodiments, an "instrusion" such as opening of a chassis drawer 105 (as detected by drawer sensors 108) and/or removal of a cover of chassis 100 (as detected by chassis cover sensor 109) may comprise a thermal escape event. If a thermal escape event exists, method 400 may proceed to step 406. Otherwise, method 400 may proceed to step 404.

At step 404, in response to the absence of a thermal escape event, management controller 112 may communicate a notification (e.g., to an operating system executing on processor 103, to a management console communicatively coupled to management controller 112 via a network, and/or to a storage controller associated with storage resources 106) that no thermal escape event exists or that a previously-asserted thermal escape event has been de-asserted. After completion of step 404, method 400 may proceed again to step 402.

At step 406, in response to the presence of a thermal escape event, management controller 112 may determine which information handling resources (e.g., storage resources 106) are affected by the thermal escape event. For example, if the thermal escape event was signaled by one or more drawer sensors 108, management controller 112 may determine the extent to which a chassis drawer 105 has been opened and thus which storage resources 106 have been removed from the interior of chassis 100. As another example, if the thermal escape event was signaled by chassis cover sensor 109, management controller 112 may determine that all storage resources 106 of information handling system 102 are affected by the thermal escape event.

At step 408, management controller 112 may determine, for each affected storage resource 106, a thermal excursion timeout period for such affected storage resource 106, the thermal excursion timeout period representative of a maximum amount of time such affected storage resource 106 may operate as affected by the thermal escape event before it reaches an unsafe temperature due to the thermal escape event. Factors that may be used by management controller 112 to determine the individual thermal excursion timeout period for each affected storage resource 106 may include characteristics of individual affected storage resources 106 and/or telemetry data received by management controller 112. Examples of characteristics of a storage resource 106 that may be used to determine its individual thermal excursion timeout period may include identifying information (e.g., vendor, model, type) of storage resource 106, a location of storage resource 106 within information handling system 102 (e.g., in which chassis drawer 105 such storage resource 106 is located, in which bay 212 of a chassis drawer such storage resource 106 is located, etc.), and/or other suitable characteristics. Examples of telemetry data that may be used to determine an individual thermal excursion timeout period of a storage resource 206 may include a temperature (e.g., proximate to such storage resource 106 or elsewhere within the information handling resource, as may be detected by temperature sensor 118), a speed of a motor of cooling system 110 used to convey cooling fluid of cooling system 110 (e.g., air or liquid), signals from drawer sensors 108 and/or chassis cover sensor 109, and/or other suitable telemetry data. To calculate or otherwise determine an individual thermal excursion timeout period for a storage resource 106, management controller 112 may access thermal data 120 which may include mathematical formulae and/or other information which may correlate the factors set forth above to a thermal excursion timeout period. For example, for a storage resource 106 having a given identifying information (e.g., a model number), its individual thermal excursion timeout period may be calculated according to an equation such as $P=L+At+Bv$ where $P$ is the individual thermal excursion timeout period, $L$ is a variable based on a location of such storage resource 106, $A$ is a thermal constant associated with such storage resource 106, $t$ is a measured temperature, $B$ is a velocity constant of such storage resource, and $v$ is a velocity of a motor for moving cooling fluid of cooling system 110. Other types of formulae and/or correlations may be used.

At step 410, having identified the affected storage resources 106 and their respective individual thermal excursion timeout periods, management controller 112 may communicate a predictive failure notification (e.g., to an operating system executing on processor 103, to a management console communicatively coupled to management controller 112 via a network, and/or to a storage controller associated with storage resources 106) indicating the presence of the thermal escape event, storage resources 106 affected by the thermal escape event, and, in some embodiments, the respective individual thermal excursion timeout periods of the affected storage resources 106.

At step 412, management controller 112 may monitor to determine when the individual thermal excursion timeout period has expired for affected storage resource 106. If an individual thermal excursion timeout period has expired, method 400 may proceed to step 414. Otherwise, method 400 may remain at step 412 (although management controller 112 may continue to monitor for the presence of the thermal escape event, and if the thermal escape event is de-asserted, may proceed to step 404, as indicated by dashed lines in FIG. 4).

At step 414, in response to expiration of an individual thermal excursion timeout period, management controller 112 may communicate a predictive failure notification (e.g., to an operating system executing on processor 103, to a management console communicatively coupled to management controller 112 via a network, and/or to a storage controller associated with storage resources 106) indicating that a storage resource 106 has exceeded its respective thermal excursion timeout period. After completion of step 414, method 400 may return to step 412, where management controller 112 may continue monitoring for expiration of thermal excursion timeout periods for other affected storage resources 106.

Although FIG. 4 discloses a particular number of steps to be taken with respect to method 400, method 400 may be executed with greater or fewer steps than those depicted in FIG. 4. In addition, although FIG. 4 discloses a certain order of steps to be taken with respect to method 400, the steps comprising method 400 may be completed in any suitable order.

Method 400 may be implemented using information handling system 102 or any other system operable to implement method 400. In certain embodiments, method 400 may be implemented partially or fully in software and/or firmware embodied in computer-readable media.

In response to either or both of the predictive failure notifications communicated at steps 410 and 414 above, a user may manually, or an operating system, application program, or other controller (e.g., a storage controller associated with an affected storage resource 106) may automatically, take remedial action. Although the types of remedial actions that may be undertaken are beyond the scope of this disclosure, examples of such remedial actions may include migrating data of affected storage resources 106 to other unaffected storage resources 106, throttling performance of affected storage resources 106, and/or powering down affected storage resources 106.

With the methods and systems disclosed, a determination of individual thermal excursion timeout periods and multiple levels of predictive failure notification (e.g., low-priority notification at step 410, high-priority notification at step 414) can be provided to the various types of storage controlling entities before drive error conditions start occurring.

Although the foregoing discussion describes systems and methods for dynamic thermal excursion timeout period determination and predictive failure notifications for storage resources 106, systems and methods identical or similar to those described herein may be applied to information handling resources other than storage resources.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. An information handling system comprising:
   a plurality of hardware-based information handling resources;
   a chassis drawer for receiving and carrying the plurality of information handling resources;
   a plurality of drawer sensors; and
   a hardware-based controller communicatively coupled to the plurality of information handling resources and configured to:
      receive signals from the plurality of drawer sensors;
      based on the signals from the plurality of drawers sensors, monitor for a presence and an extent of a thermal escape event of the information handling system, wherein the thermal escape event is an opening of the chassis drawer, wherein the extent of the thermal escape event is an amount by which the chassis drawer has been opened, and wherein individual ones of the signals from the plurality of drawer sensors are indicative of the amount by which the chassis drawer has opened;
      responsive to detecting the presence and extent of the thermal escape event, determine one or more affected information handling resources of the plurality of information handling resources that are thermally affected by the thermal escape event;
      determine for each of the one or more affected information handling resources a respective thermal excursion timeout period, wherein the respective thermal excursion timeout periods are based on the extent of the thermal escape event and are determined individually for each of the one or more affected information handling resources; and
      transmit a notification of at least one of the respective thermal excursion timeout periods.

2. The information handling system of claim 1, wherein the controller is further configured to communicate a predictive failure notification associated with the one or more affected information handling resources responsive to at least one of:
   detecting the presence and extent of the thermal escape event and determining the one or more affected information handling resources; and
   determining that the respective thermal excursion timeout period for at least one of the one or more affected information handling resources has expired.

3. The information handling system of claim 1, wherein the controller is further configured to:
   communicate a first predictive failure notification associated with the one or more affected information handling resources responsive to detecting the presence and extent of the thermal escape event and determining the one or more affected information handling resources; and
   communicate a second predictive failure notification associated with the one or more affected information handling resources responsive to determining that the respective thermal excursion timeout period for at least one of the one or more affected information handling resources has expired.

4. The information handling system of claim 1, wherein determining the one or more affected information handling resources of the plurality of information handling resources comprises determining which of the plurality of information handling resources have been translated to a position external to the chassis as a result of the opening of the chassis drawer.

5. The information handling system of claim 1, wherein the plurality of information handling resources comprises a plurality of storage resources.

6. The information handling system of claim 1, wherein each respective thermal excursion timeout period is determined based on at least one of:
   one or more characteristics of the information handling resource for which the respective thermal excursion timeout period is associated; and
   telemetry data associated with the information handling system.

7. The information handling system of claim 6, wherein the one or more characteristics comprise at least one of:
   identifying information associated with the information handling resource for which the respective thermal excursion timeout period is associated; and
   a location within the information handling system of the information handling resource for which the respective thermal excursion timeout period is associated.

8. The information handling system of claim 6, wherein the telemetry data comprises at least one of:
   a temperature associated with the information handling system; and
   a speed of a motor for moving cooling fluid of a cooling system of the information handling system.

9. The information handling system of claim 1, wherein the controller is further configured to communicate a de-assertion notification associated with the one or more affected information handling resources responsive to detecting that the thermal escape event has been de-asserted.

10. A method comprising:
receiving signals from a plurality of drawer sensors of an information handling system, the information handling system including a plurality of hardware-based information handling resources carried in a chassis drawer of a chassis;
based on the signals from the plurality of drawer sensors, monitoring for a presence and an extent of a thermal escape event of the information handling system, wherein the thermal escape event is an opening of the chassis drawer, wherein the extent of the thermal escape event is an amount by which the chassis drawer has been opened, and wherein individual ones of the signals from the plurality of drawer sensors are indicative of the amount by which the chassis drawer has opened;
responsive to detecting the presence and extent of the thermal escape event, determining one or more affected information handling resources of the plurality of information handling resources that are thermally affected by the thermal escape event;
determining for each of the one or more affected information handling resources a respective thermal excursion timeout period, wherein the respective thermal excursion timeout periods are based on the extent of the thermal escape event and are determined individually for each of the one or more affected information handling resources; and
transmitting a notification of at least one of the respective thermal excursion timeout periods.

11. The method of claim 10, further comprising communicating a predictive failure notification associated with the one or more affected information handling resources responsive to at least one of:
detecting the presence and extent of the thermal escape event and determining the one or more affected information handling resources; and
determining that the respective thermal excursion timeout period for at least one of the one or more affected information handling resources has expired.

12. The method of claim 10, further comprising:
communicating a first predictive failure notification associated with the one or more affected information handling resources responsive to detecting the presence and extent of the thermal escape event and determining the one or more affected information handling resources; and
communicating a second predictive failure notification associated with the one or more affected information handling resources responsive to determining that the respective thermal excursion timeout period for at least one of the one or more affected information handling resources has expired.

13. The method of claim 10, wherein determining the one or more affected information handling resources of the plurality of information handling resources comprises determining which of the plurality of information handling resources have been translated to a position external to the chassis as a result of the opening of the chassis drawer.

14. The method of claim 10, wherein the plurality of information handling resources comprises a plurality of storage resources.

15. The method of claim 10, wherein each respective thermal excursion timeout period is determined based on at least one of:
one or more characteristics of the information handling resource for which the respective thermal excursion timeout period is associated; and
telemetry data associated with the information handling system.

16. The method of claim 15, wherein the one or more characteristics comprise at least one of:
identifying information associated with the information handling resource for which the respective thermal excursion timeout period is associated; and
a location within the information handling system of the information handling resource for which the respective thermal excursion timeout period is associated.

17. The method of claim 15, wherein the telemetry data comprises at least one of:
a temperature associated with the information handling system; and
a speed of a motor for moving cooling fluid of a cooling system of the information handling system.

18. The method of claim 10, further comprising communicating a de-assertion notification associated with the one or more affected information handling resources responsive to detecting that the thermal escape event has been de-asserted.

* * * * *